US010171483B1

(12) United States Patent
Banerjee (10) Patent No.: US 10,171,483 B1
(45) Date of Patent: Jan. 1, 2019

(54) UTILIZING ENDPOINT ASSET AWARENESS FOR NETWORK INTRUSION DETECTION

(71) Applicant: Symantec Corporation, Mountain View, CA (US)

(72) Inventor: Deb Banerjee, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 11 days.

(21) Appl. No.: 13/974,440

(22) Filed: Aug. 23, 2013

(51) Int. Cl.
*H04L 29/06* (2006.01)
*G06F 21/55* (2013.01)

(52) U.S. Cl.
CPC ........ *H04L 63/1416* (2013.01); *G06F 21/552* (2013.01); *G06F 21/554* (2013.01)

(58) Field of Classification Search
CPC ............ H04L 63/1433; H04L 63/0227; H04L 9/3247; H04L 63/1416; H04L 63/1408; H04L 63/1425; H04L 63/104; G06F 21/554; G06F 21/566
USPC .......................................................... 726/23
See application file for complete search history.

(56) References Cited

U.S. PATENT DOCUMENTS

| | | | |
|---|---|---|---|
| 5,295,266 A | 3/1994 | Hinsley et al. | |
| 5,412,717 A | 5/1995 | Ficher | |
| 5,978,484 A | 11/1999 | Apperson et al. | |
| 6,158,010 A | 12/2000 | Moriconi et al. | |
| 6,279,113 B1 * | 8/2001 | Vaidya | H04L 63/1416 709/229 |
| 6,499,109 B1 | 12/2002 | Balasubramaniam et al. | |
| 6,505,300 B2 | 1/2003 | Chan et al. | |
| 6,785,732 B1 | 8/2004 | Bates et al. | |
| 7,103,914 B2 | 9/2006 | Focke et al. | |
| 7,181,769 B1 * | 2/2007 | Keanini | H04L 63/1416 713/166 |
| 7,222,366 B2 * | 5/2007 | Bruton, III | H04L 63/1408 726/23 |
| 7,281,266 B2 | 10/2007 | Goodman et al. | |
| 7,331,062 B2 | 2/2008 | Alagna et al. | |
| 7,343,626 B1 | 3/2008 | Gallagher | |
| 7,359,976 B2 | 4/2008 | Ross et al. | |
| 7,380,277 B2 | 5/2008 | Szor | |
| 7,383,581 B1 | 6/2008 | Moore et al. | |
| 7,398,553 B1 | 7/2008 | Li | |
| 7,409,718 B1 | 8/2008 | Hong et al. | |
| 7,657,927 B2 | 2/2010 | Tajalli et al. | |
| 7,904,960 B2 * | 3/2011 | Ithal | 726/23 |
| 8,112,799 B1 | 2/2012 | Loiodice et al. | |
| 8,272,055 B2 * | 9/2012 | Wease | H04L 63/1408 713/193 |

(Continued)

OTHER PUBLICATIONS

Skoudis et al., "Malware: Fighting Malicious Code", Nov. 7, 2003, Prentice Hall, Print ISBN-10: 0-13-101405-6 Print ISBN-13: 978-0-13-101405-3.

*Primary Examiner* — Malcolm Cribbs
*Assistant Examiner* — Bryan Wright
(74) *Attorney, Agent, or Firm* — Meyertons Hood Kivlin Kowert and Goetzel PC; Rory D. Rankin (57) ABSTRACT

An intrusion device identifies network data to be sent to a destination endpoint and determines a sensitivity level of the destination endpoint based on asset valuation. The intrusion device identifies a subset of signatures that corresponds to the sensitivity level of the destination endpoint and determines whether the network data includes an intrusion based on the subset of signatures.

17 Claims, 3 Drawing Sheets

(56) References Cited

U.S. PATENT DOCUMENTS

| | | | |
|---|---|---|---|
| 8,479,297 B1* | 7/2013 | Edukulla | H04L 63/1433 713/188 |
| 8,924,731 B2* | 12/2014 | Park et al. | 713/181 |
| 2002/0147923 A1 | 10/2002 | Dotan | |
| 2003/0188189 A1* | 10/2003 | Desai | H04L 63/104 726/23 |
| 2004/0073800 A1* | 4/2004 | Shah et al. | 713/176 |
| 2004/0103200 A1 | 5/2004 | Ross et al. | |
| 2004/0260754 A1 | 12/2004 | Olson et al. | |
| 2005/0021791 A1 | 1/2005 | Sakiyama et al. | |
| 2005/0097339 A1* | 5/2005 | Wiley | G06F 21/554 713/188 |
| 2006/0075493 A1 | 4/2006 | Karp et al. | |
| 2006/0143688 A1 | 6/2006 | Futoransky et al. | |
| 2006/0190563 A1 | 8/2006 | Vann | |
| 2006/0212572 A1* | 9/2006 | Afek et al. | 709/225 |
| 2006/0265748 A1* | 11/2006 | Potok | H04L 63/1425 726/23 |
| 2006/0272024 A1* | 11/2006 | Huang et al. | 726/26 |
| 2007/0016948 A1 | 1/2007 | Dubrovsky et al. | |
| 2007/0297405 A1* | 12/2007 | He | 370/389 |
| 2008/0016208 A1* | 1/2008 | Treinen | 709/224 |
| 2008/0263650 A1 | 10/2008 | Kerschbaum | |
| 2008/0289040 A1* | 11/2008 | Ithal | H04L 63/1416 726/23 |
| 2008/0307524 A1* | 12/2008 | Singh et al. | 726/22 |
| 2009/0019547 A1* | 1/2009 | Palliyil | G06F 21/566 726/25 |
| 2009/0063869 A1* | 3/2009 | Kohavi et al. | 713/189 |
| 2010/0124235 A1* | 5/2010 | Walsh | G06Q 30/0225 370/449 |
| 2010/0125900 A1* | 5/2010 | Dennerline et al. | 726/13 |
| 2012/0324579 A1* | 12/2012 | Jarrett | G06F 21/552 726/24 |
| 2012/0331553 A1* | 12/2012 | Aziz | G06F 21/554 726/23 |
| 2013/0333038 A1* | 12/2013 | Chien | H04L 63/1408 726/23 |

\* cited by examiner

UTILIZING ENDPOINT ASSET AWARENESS FOR NETWORK INTRUSION DETECTION

TECHNICAL FIELD

The present disclosure relates to data center network-based intrusion systems, and more particularly, to integrating endpoint asset awareness to improve data center network-based intrusion systems.

BACKGROUND

An Enterprise, such as, a business organization, can store data in Enterprise data centers. The data centers can include firewalls that control the incoming and outgoing network traffic by analyzing the data packets and determining whether the data should be allowed through or not. The Enterprise data center can include an intrusion system (e.g., intrusion detection system (IDS), intrusion prevention system (IPS)) behind the firewall to monitor network and/or system activities for malicious activities. For example, a data center may be infected with malicious software, also known as "malware" (e.g., computer viruses, worms, Trojan horses, spyware, etc.). The intrusion systems generally have a large collection of signatures to apply to the incoming network payloads to detect and block threats against server workloads in the data center. Traditional intrusion systems apply every signature in the collection to every network payload, which can cause resource bottlenecks and can negatively affect network throughput.

SUMMARY

In one implementation, an apparatus for integrating endpoint asset awareness to improve data center network-based intrusion systems is described. An exemplary apparatus may include a memory and a processing device that is coupled to the memory. In one embodiment, the apparatus identifies network data to be sent to a destination endpoint, determines a sensitivity level of the destination endpoint based on asset valuation, identifies a subset of signatures that corresponds to the sensitivity level of the destination endpoint, and determines whether the network data includes an intrusion based on the subset of signatures.

In one implementation, the apparatus is to identify the subset of signatures that corresponds to the sensitivity level of the destination endpoint by identifying one or more rules that correspond to the sensitivity level of the destination endpoint. The one or more rules describe a number of signatures in the subset of signatures and specify the individual signatures to be included in the subset of signatures. In one implementation, the apparatus is to identify the subset of signatures that corresponds to the sensitivity level of the destination endpoint by identifying individual signatures of the plurality of signatures based on one or more policies, wherein the one or more policies define the individual signatures that correspond to the sensitivity level of the destination endpoint based on user input. In one implementation, the apparatus is to identify the subset of signatures that corresponds to the sensitivity level of the destination endpoint by identifying a number of signatures that is proportional to the sensitivity level of the destination endpoint. In one implementation, the number of signatures that is proportional to the sensitivity level of the destination endpoint includes a number of signatures that corresponds to a high level of sensitivity that is greater than a number of signatures that corresponds to a low level of sensitivity.

In one implementation, the apparatus is to determine whether the network data includes an intrusion by prioritizing scanning of the network data based on the sensitivity level of the destination endpoint. In one implementation, the sensitivity level of the destination endpoint is based on user input and/or user activity data.

In addition, a non-transitory computer readable storage medium for integrating endpoint asset awareness to improve data center network-based intrusion systems is described. An exemplary non-transitory computer readable storage medium includes instructions that will cause a processing device to identify network data to be sent to a destination endpoint, determine a sensitivity level of the destination endpoint based on asset valuation, identify a subset of signatures that corresponds to the sensitivity level of the destination endpoint, and determine whether the network data includes an intrusion based on the subset of signatures.

Further, a method for integrating endpoint asset awareness to improve data center network-based intrusion systems is described. In one embodiment, a method comprises identifying network data to be sent to a destination endpoint, determining a sensitivity level of the destination endpoint based on asset valuation, identifying a subset of signatures that corresponds to the sensitivity level of the destination endpoint, and determining whether the network data includes an intrusion based on the subset of signatures.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are a method and apparatus for integrating endpoint asset awareness to improve data center network-based intrusion systems, according to various implementations. Implementations of the present disclosure prioritize, via an intrusion system (e.g., intrusion detection system (IDS), intrusion prevention system (IPS)), the evaluation of incoming network payloads to minimize risk of malicious intrusions and maximize network throughput. Implementations include a prioritization module in an intrusion system to classify the sensitivity level of the destination endpoint of a corresponding network payload and to compare the network payload to an appropriate number of signatures based on the sensitivity level of the destination endpoint. For example, if the destination endpoint is highly sensitive, the prioritization module may compare the network payload to a large number of signatures. In another example, if the destination endpoint is not sensitive or not highly sensitive, the prioritization module may compare the network payload to a small number of signatures. Implementations optimize the network throughput by reducing the number of signatures that are to be used for evaluating a network payload in proportion to the sensitivity level of the corresponding destination endpoint. Implementations can prioritize the evaluation of the network payloads that are for sensitive endpoints over the evaluation of the network payloads that are for non-sensitive endpoints. By prioritizing specifically which assets (e.g., destination endpoints) are worth protecting, the prioritization module in the intrusion system (e.g., IDS, IPS) can target which signatures to run against which network payloads and network packets. Sensitivity of the endpoints can be determined through a variety of means including scanning data accessible on the endpoints, and analyzing the criticality of users accessing data on the corresponding endpoints.

Figure 1:
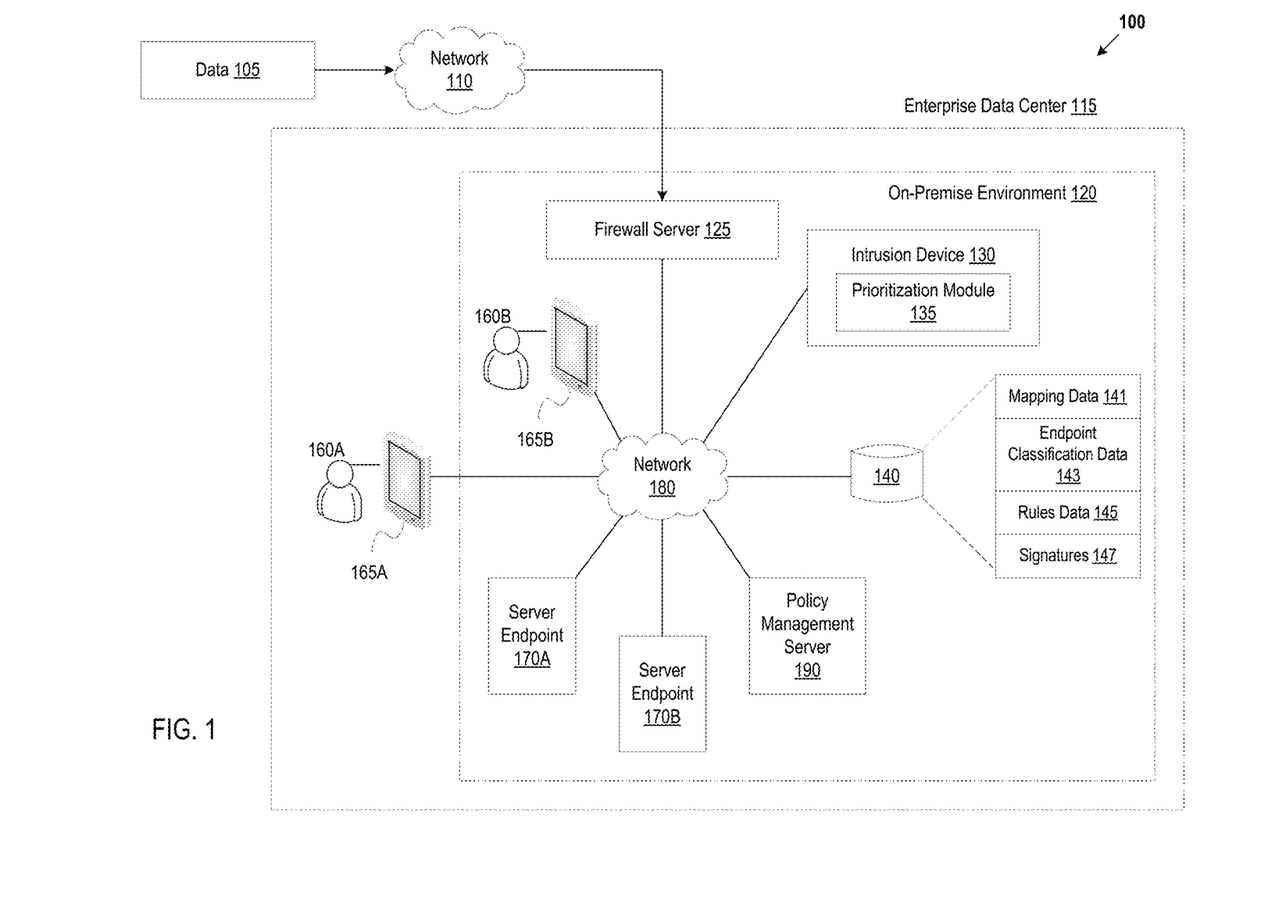
FIG. 1 illustrates example system architecture, in accordance with various implementations.

FIG. 1 is an example system architecture 100 in which implementations of the present disclosure can be implemented. The system architecture 100 can include one or more servers 125,170A-B,190, one or more intrusion devices 130, one or more client devices 165A-B, and one or more data stores 140 connected via one or more networks 110,180. The networks 110,180 can include one or more local area networks (LAN), one or more wireless networks, one or more mobile communications networks, one or more wide area networks (WAN), such as the Internet, or similar communication systems, or combinations of such. The networks 110,180 can include one or more networking and/or computing devices such as wired and wireless devices.

The networks 110,180 may be private networks or public networks. For example, the network 180 may be a private network. A private network is hereinafter referred to as an on-premise network. For example, an Enterprise may provide and manage an on-premise network 180 in an on-premise environment 120. An Enterprise can be an entity such as, and not limited to, any person, a business organization such as a corporation, an educational institution such as a college and university, etc.

An Enterprise can provide and manage a data center 115 that includes components (e.g., servers, networks, intrusion devices, data stores, client devices, etc.) in an on-premise environment 120 and components (e.g., client devices, networks, etc.) in an off-premise environment. For example, a user 160A may use a client device 165A in an off-premise environment to connect to the private network 180 remotely. In another example, a user 160B may use a client device 165B in an on-premise environment 120 to connect to the private network 180. A client device 165A-B can be a computing device such as a desktop computer, a set-top box, a gaming console, a television, a portable computing device such as, and not limited to, a tablet computer, a mobile telephone, a personal digital assistant (PDA), a portable media player, a netbook, a laptop computer, an electronic book reader, and the like.

The data center 115 can receive network packets via one or more networks 110. A network packet can consist of control information and user data (e.g., data 105) (also known as network payload). The network payload (e.g., data 105) may be delivered from external sources or internal sources, such as client endpoints 165A-B or server endpoints 170A-B. The data center 115 can include one or more firewall servers 125 that provide firewalls to examine the data 105 for intrusions (e.g., malware, exploits, etc.) and can limit access between networks 110,180 to prevent intrusions from affecting the data center 115. The firewalls may be in front of and/or behind intrusion (e.g., intrusion detection system, intrusion prevention system) devices 130.

The data center 115 can be infected with malicious software, also known as "malware." Malware can include, for example, computer viruses, worms, Trojan horses, spyware, etc. An "exploit" hereinafter refers to a piece of malware. Exploits can be used to compromise servers (e.g., server endpoints 170A-B) and the data on the servers by using vulnerabilities in the software on the endpoints (e.g., server endpoints 170A-B). Malware and exploits can be delivered through network data (e.g., data 105). The data center 115 can include an intrusion device 130 to evaluate the data 105 (e.g., network payloads) once they are within the data center 115. The intrusion device 130 can be a passive system, such as an intrusion detection system (IDS), or a reactive system, such as an intrusion prevention system (IPS). In one implementation, the intrusion device 130 is an intrusion detection system that may be placed offline and can receive a copy of the traffic (e.g., data 105) from the firewall server 125. In another implementation, the intrusion device 130 is an intrusion prevention system that may be placed in-line and can monitor the traffic (e.g., data 105) from the firewall in real-time. The intrusion prevention system can actively prevent (e.g., block) intrusions that are detected. For example, the intrusion device 130 may automatically respond to suspicious activity by resetting a connection or by reprogramming the firewall to block network traffic from the suspected malicious source.

The data store 140 can store signatures 147 for determining whether data 105 (e.g., network payload) contains an intrusion (e.g., malware, exploits, etc.). The signatures 147 can be pre-configured and pre-determined attack patterns. The signatures 147 may be user (e.g., system administrator) defined. The signatures 147 may be atomic signatures, which represent the simplest signature type. For an atomic signature, the intrusion device 130 can examine a single packet, activity, or event to determine if the signature should trigger a signature action.

The data store 140 may store a significant amount of signatures 147, and the intrusion device 130 may receive a large amount of data 105 (e.g., network payloads) to evaluate. The intrusion device 130 can include a prioritization module 135 to minimize the risk of intrusion while maximizing the network performance of the data center 115.

The data 105 can be intended for a destination endpoint in the data center 115. The destination endpoints can be client endpoints (e.g., client devices 165A-B) and/or server endpoints 170A-B (e.g., application servers, web servers, databases, infrastructure services servers, etc.). Destination endpoints may be related to data that is more highly sensitive than other destination endpoints. The Enterprise data center 115 can store data that may have sensitive content. For example, Enterprise data may include confidential customer information, sensitive research documents, proprietary designs, etc. For example, server endpoint 170A may be a financial application server that is associated with highly sensitive data, and server endpoint 170B may be a test server that is associated test data that is not sensitive. The risk of an intrusion (e.g., malware, exploits, etc.) accessing the highly sensitive data associated with server endpoint 170A is greater than the risk of intrusion of data on server endpoint 170B, which is not sensitive.

The prioritization module 135 can determine which destination endpoint that the data 105 (e.g., network payload) is to be sent to and can determine the sensitivity level of the destination endpoint. The prioritization module 135 can determine which subset of signatures 147 to run on the data 105 based on the sensitivity level of the destination endpoint to optimize the performance of the data center 115. For example, when the data 105 is to be sent to a highly-sensitive destination endpoint, the prioritization module 135 can run more signatures 147 against the data 105, and when the data 105 is to be sent to a non-sensitive destination endpoint, the prioritization module 135 can run less signatures 147 against the data 105.

The prioritization module 135 can use mapping data 141, endpoint classification data 143, rules data 145, and the signatures 147 that are stored in one or more data store 140 to prioritize the evaluation of the data 105 (e.g., network payloads). The data center 115 can include a policy management server 190 to create the mapping data 141, the endpoint classification data 143, and the rules data 145.

The data 105 (e.g., network payloads) can include destination identifiers. Examples of destination identifiers can include, and are not limited to, IP (internet protocol) addresses, server names, client names, etc. The mapping data 141 can map the destination identifiers in the network payloads to the sensitivity classifications in the endpoint classification data 143.

The endpoint classification data 143 can describe the sensitivity level of the various destination endpoints for the data center 115. For example, the data 105 may include an IP address for the destination endpoint, and the mapping data 141 may indicate that the IP address corresponds to server endpoint 170A, which is a financial application server. The endpoint classification data 143 may describe that server endpoint 170A (e.g., financial application server) is "highly-sensitive". In another example, the data 105 may include an IP address for the destination endpoint, and the mapping data 141 may indicate that the IP address corresponds to server endpoint 170B, which is a test server. The endpoint classification data 143 may describe that server endpoint 170B (e.g., test server) is "non-sensitive".

Various sensitivity identifiers can be used to describe the sensitivity level. For example, sensitivity levels can include, and are not limited to, 'highly-sensitive', 'moderately-sensitive', 'non-sensitive', 'sensitive-high', 'sensitive-medium', and 'sensitive-low.' In another example, sensitivity levels can include, and are not limited to, 'sensitive-1', 'sensitive-2', and 'sensitive-n', where a scale may represent a degree of sensitivity.

The policy management server 190 can create rules data 145 that specifies which of the signatures 147 that the prioritization module 135 should use to evaluate incoming data 105 (e.g., network payloads) based on the sensitivity classification of the corresponding destination endpoint for the data 105. For example, the rules data 145 may specify that if incoming data 105 (e.g., network payload) is to be sent to a destination endpoint that is classified as highly-sensitive then the prioritization module 135 should compare a large number of the signatures 147 to the incoming data 105. The rules data 145 may specify which signatures 147 should be used by the prioritization module 135 for certain classifications of destination endpoints.

The policy management server 190 can create the mapping data 141, endpoint classification data 143, and/or rules data 145 from user (e.g., system administrator) input via user interface (UI) that is coupled to the policy manager server 190. The UI can be a graphical user interface (GUI), a command line interface, etc. In one implementation, the policy management server 190 sends the mapping data 141, the endpoint classification data 143, and the rules data 145 to the prioritization module 135, and the prioritization module 135 stores the mapping data 141, the endpoint classification data 143, and the rules data 145 in the data store 140.

The prioritization module 135 can access the mapping data 141, endpoint classification data 143, rules data 145, and signatures 147 to determine which rules to apply to a particular network payload, how many threat detection signatures 147 to run against the particular network payload as specified by the rules, and which threat detection signatures 147 to run against the particular network payload as specified by the rules, while maintaining an expected network throughput without increasing risk of intrusion. The prioritization module 135 can identify a number of signatures that is proportional to the sensitivity level of the destination endpoint. The number of signatures that corresponds to a high level of sensitivity can be greater than the number of signatures that corresponds to a low level of sensitivity. For example, the prioritization module 135 can identify any traffic (e.g., data 105) that is to be sent to sensitive destination endpoints and run more signatures against that traffic. In another example, the prioritization module 135 can identify any traffic (e.g., data 105) that is to be sent to non-sensitive destination endpoints and run less signatures against that traffic.

The servers (e.g., firewall server 125, application server 170, policy management server 190, etc.) can be hosted on one or more machines. The machines can include, and are not limited to, any data processing device, such as a server computer, gateway computer, desktop computer, a laptop computer, a mainframe computer, a personal digital assistant, a handheld device or any other device configured to process data.

The data stores 140 may be mass storage devices, such as magnetic or optical storage based disks, solid-state drives (SSDs) or hard drives. The data stores 140 can be persistent storage units. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 2:
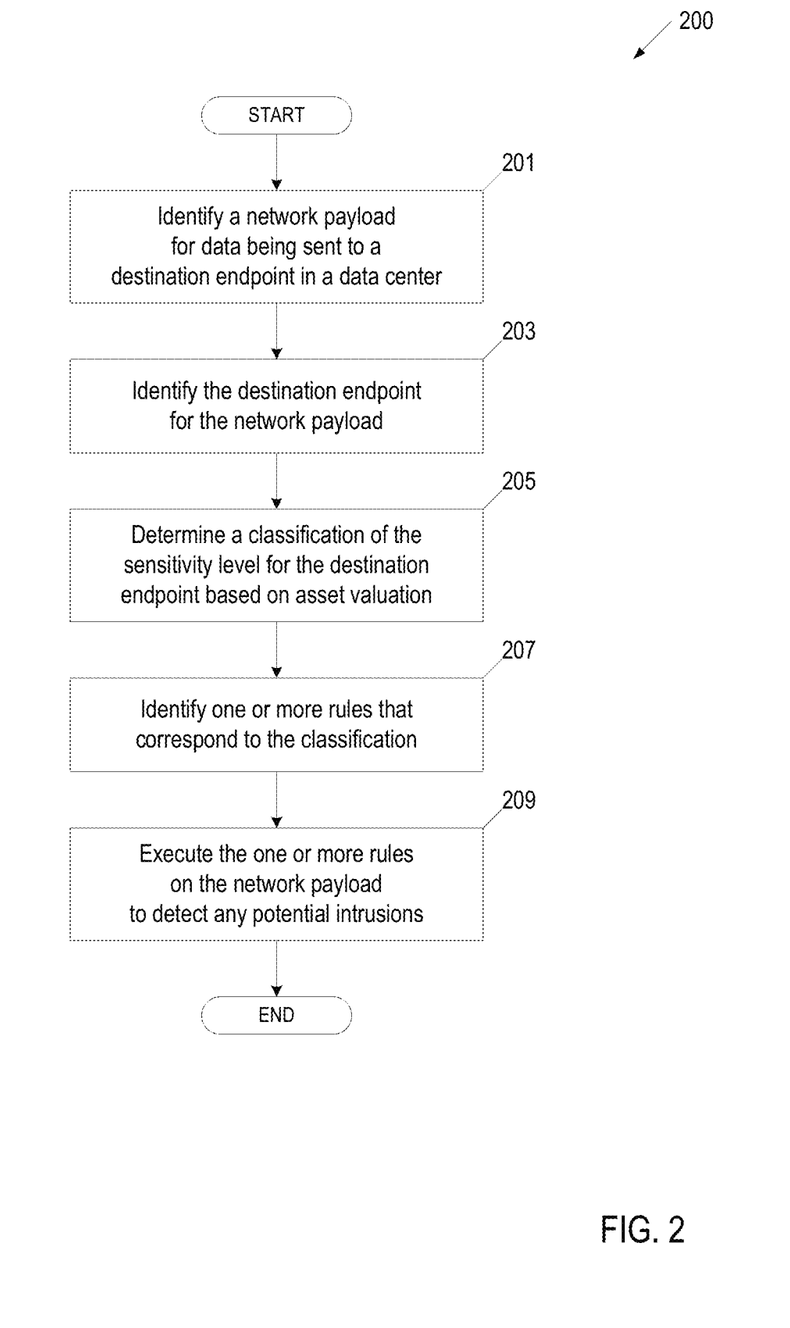
FIG. 2 is a flow diagram illustrating an implementation for a method for integrating endpoint awareness to improve data center network-based intrusion systems.

FIG. 2 is a flow diagram of an implementation of a method 200 for integrating endpoint asset awareness to improve data center network-based intrusion systems. Method 200 can be performed by processing logic that can comprise hardware (e.g., circuitry, dedicated logic, programmable logic, microcode, etc.), software (e.g., instructions run on a processing device), or a combination thereof. In one implementation, method 200 is performed by a prioritization module 135 in an intrusion device 130 of FIG. 1.

At block 201, the prioritization module receives a network payload for data (e.g., file, application requests/responses) being sent to a destination endpoint. The destination endpoint may be in an Enterprise data center. The network payload may be delivered from external sources or internal sources, such as client endpoints or server endpoints. Firewalls may be in front of and/or behind IDS/IPS devices. At block 203, the prioritization module identifies the destination endpoint for the network payload. The destination endpoint can reside on-premise or off-premise. Examples of destination endpoints can include, for example, client endpoints and server endpoints. Examples of server endpoints can include, and are not limited to, web servers, application servers, databases, infrastructure services, etc. The prioritization module can determine a destination identifier (e.g., IP address, endpoint name, etc.) from header data from the network payload. The prioritization module can use the destination identifier as a key to mapping data that maps destination identifiers to destination endpoints. For example, the prioritization module may determine that the IP address in the header for the network payload maps to a destination endpoint being a financial application server. In another example, the prioritization module may determine that the endpoint name for the network payload maps to a destination endpoint being a test server. The mapping data can be stored in a data store that is coupled to the prioritization module.

In one implementation, the prioritization module performs a hash function on the destination identifier to compute a hash value. The hash function can be defined in configuration data that is stored in a data store that is coupled to the prioritization module. The prioritization module can determine the destination endpoint using the hash value as a key to the mapping data. For example, the prioritization module can use the hash value to query a mapping service for the destination endpoint that corresponds to the destination identifier. The mapping service can be hosted by a server computer system in an Enterprise environment (e.g., on-premise environment 120 in FIG. 1). For example, the query response may indicate that an IP address for the network payload maps to a financial application server.

At block 205, the prioritization module determines the classification of the sensitivity level for the destination endpoint based on asset valuation. The prioritization module can access endpoint classification data that is stored in the data store that describes the valuation of various assets. The prioritization module can use the destination identifier or the actual destination endpoint as a key for the endpoint classification data to identify the classification for the destination endpoint in the endpoint classification data. The endpoint classification data can indicate whether the destination endpoint is, for example, and not limited to, "highly-sensitive", "moderately-sensitive", "non-sensitive", etc. For example, the endpoint classification data may classify a financial application server as "highly-sensitive" and a test server as "non-sensitive".

In one implementation, the prioritization module performs a hash function on the destination endpoint to compute a hash value. The prioritization module can determine a classification of the sensitivity level of the destination endpoint using the hash value as a key to the endpoint classification data. For example, the prioritization module can use the hash value to query a data classification service for the sensitivity level for the destination endpoint. The data classification service can be hosted by a server computer system in an Enterprise environment (e.g., on-premise environment 120 in FIG. 1). For example, the query response may indicate that the financial application server is classified as 'highly-sensitive'.

The sensitivity level of the destination endpoints can be based on user (e.g., system administrator) input and/or user activity data. For example, a policy management server (e.g., policy management server 190 in FIG. 1) can be coupled to one or more data stores that store data describing the types of users (e.g., users 160A-B in FIG. 1) that are accessing the data in the destination endpoints. For example, Server-Endpoint-A may be accessed by users from the Finance and/or Accounting departments in the Enterprise and the policy management server may determine that Server-Endpoint-A is highly-sensitive.

At block 207, the prioritization module identifies one or more rules that correspond to the classification of the destination endpoint. The prioritization module can access rules data that is stored in the data store. The prioritization module can use the classification (e.g., highly-sensitive, moderately-sensitive, etc.) as a key for the rules data to identify the one or more rules that correspond to the classification of the sensitivity level for the destination endpoint. For example, the classification for the financial application server may be "highly-sensitive", and the rules that correspond to the "highly-sensitive" classification may indicate that the intrusion device should compare a large number of specified signatures to the network payload and that the comparisons should be high priority.

At block 209, the prioritization module executes one or more rules on the network payload to determine whether the data includes an intrusion (e.g., exploits, malware, etc.). The rules can specify which signatures the prioritization module should compare against the network payload. The rules may specify a subset of signatures from a collection of signatures that should be used by the prioritization module for a particular classification of a destination endpoint. The rules may specify a prioritization action to be taken by the prioritization module. For example, the rules may specify that when the sensitivity level of the destination endpoint is a low level of sensitivity, the prioritization module should mark an evaluation of the data as low priority. In another example, the rules may specify that when the sensitivity level of the destination endpoint is a high level of sensitivity, the prioritization module should mark an evaluation of the data as high priority. The prioritization module can be coupled to a data store that stores configuration data that defines one or more thresholds for various levels of sensitivity.

The prioritization module can access the signatures in the data store that is coupled to the prioritization module. For example, a collection of signatures may include one thousand signatures. For example, the classification for the test server may be "non-sensitive", and the rules that correspond to the "non-sensitive" classification may indicate that prioritization module should compare a subset including three signatures (e.g., Signature-14666, Signature-32564, and Signature-83479) to the network payload and that the comparisons should be low priority. The prioritization module can add the comparisons for the "non-sensitive" classification to the bottom of a queue. In another example, the rules that correspond to the "highly-sensitive" classification may indicate that prioritization module should compare a subset including fifty signatures (e.g., Signature-1 to Signature-50) to the network payload and that the comparisons should be high priority. The prioritization module can add the comparisons for the "highly-sensitive" classification to the top of the queue.

Figure 3:
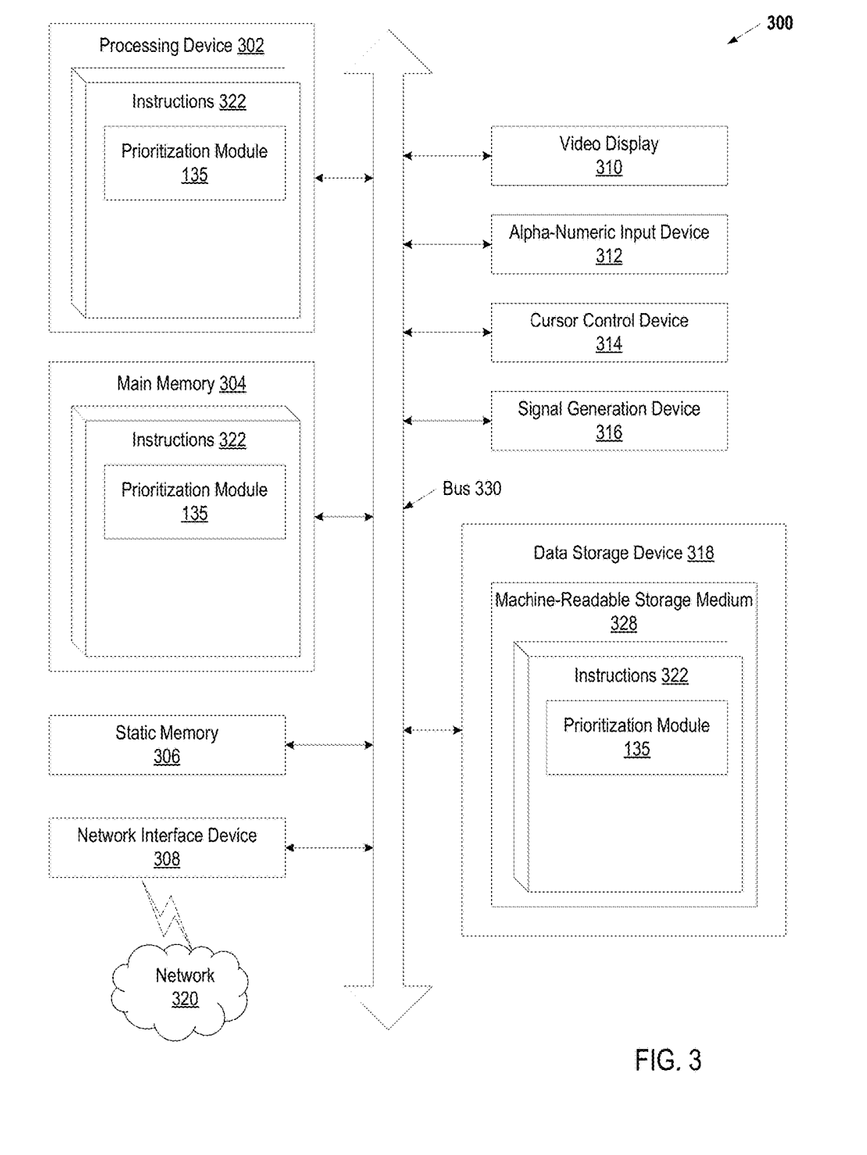
FIG. 3 is a block diagram of an example computer system that may perform one or more of the operations described herein.

FIG. 3 illustrates an example machine of a computer system 300 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 300 includes a processing device 302, a main memory 304 (e.g., read-only memory (ROM), flash memory, dynamic random access memory (DRAM) such as synchronous DRAM (SDRAM) or DRAM (RDRAM), etc.), a static memory 306 (e.g., flash memory, static random access memory (SRAM), etc.), and a data storage device 318, which communicate with each other via a bus 330.

Processing device 302 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. The processing device 302 is configured to execute instructions 322 for performing the operations and steps discussed herein.

The computer system 300 may further include a network interface device 308. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

The data storage device 318 may include a machine-readable storage medium 328 (also known as a computer-readable medium) on which is stored one or more sets of instructions 322 or software embodying any one or more of the methodologies or functions described herein. The instructions 322 may also reside, completely or at least partially, within the main memory 304 and/or within the processing device 302 during execution thereof by the computer system 300, the main memory 304 and the processing device 302 also constituting machine-readable storage media.

In one implementation, the instructions 322 include instructions for a prioritization module (e.g., prioritization module 135 of FIG. 1) and/or a software library containing methods that call modules in a prioritization module. While the machine-readable storage medium 328 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "prioritizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   determining, by a prioritizing scan, a destination identifier from a network payload;
   performing, by the prioritizing scan, a hash function on the destination identifier to compute a hash value, wherein a destination endpoint is determined by using the hash value as a key to query destination mapping data and wherein the hash function is defined in stored configuration data;
   determining, by a processing device executing an intrusion device, a sensitivity level of the destination endpoint that was determined based on the hash value, wherein the sensitivity level is based at least in part on a content of data stored at the destination endpoint;
   identifying one or more rules that correspond to sensitive content data stored at the destination endpoint, wherein the one or more rules describe a number of signatures in a subset of the plurality of signatures and specify individual signatures from the plurality of signatures to be included in the subset of the plurality of signatures and a prioritization action;
   wherein the subset of signatures specific to the sensitive content data stored at the destination endpoint comprises a number of signatures that is proportional to a sensitivity level of content data stored at the destination endpoint, and wherein first content of the specific subset of the plurality of signatures is distinct from second content of other subsets of the plurality of signatures that correspond to other sensitivity levels; and
   determining, by the intrusion device, whether network data comprises an intrusion in view of the subset of signatures, wherein determining whether the network data comprises an intrusion comprises prioritizing scanning of the network data in view of one or more thresholds for various sensitivity levels of the destination endpoint, and applying the prioritization action to the network data.

2. The method of claim 1, wherein identifying the subset of signatures specific to the confidentiality of the sensitive content data stored at the destination endpoint comprises:
   identifying individual signatures of the plurality of signatures in view of one or more policies,
   wherein the one or more policies define the individual signatures that correspond to the confidentiality of the sensitive content data stored at the destination endpoint in view of user input.

3. The method of claim 1, wherein identifying the number of signatures that is proportional to the confidentiality of the sensitive content data stored at the destination endpoint comprises:
   identifying a greater number of signatures for data that corresponds to a high level of sensitivity than a number of signatures for data that corresponds to a low level of sensitivity.

4. The method of claim 1, wherein the confidentiality of the sensitive content data stored at the destination endpoint is in view of at least one of user input or user activity data.

5. An apparatus comprising:
   a memory; and
   a processing device comprising circuitry configured to:
   determine a destination identifier from a network payload;
   perform a hash function on the destination identifier to compute a hash value, wherein a destination endpoint is determined by using the hash value as a key to query destination mapping data and wherein the hash function is defined in stored configuration data;
   determine a sensitivity level of the destination endpoint that was determined based on the hash value, wherein the sensitivity level is based at least in part on confidentiality of content of data stored at the destination endpoint;
   identify one or more rules that correspond to sensitive content data stored at the destination endpoint, wherein the one or more rules describe a number of signatures in a subset of the plurality of signatures and specify individual signatures from the plurality of signatures to be included in the subset of the plurality of signatures and a prioritization action;
   wherein the subset of signatures specific to the sensitive content data stored at the destination endpoint comprises
   a number of signatures that is proportional to a sensitivity level of content data stored at the destination endpoint, and wherein first content of the specific subset of the plurality of signatures is distinct from second content of other subsets of the plurality of signatures that correspond to other sensitivity levels;
   determine whether the network data comprises an intrusion in view of the subset of signatures, wherein to determine whether the network data comprises an intrusion comprises prioritizing scanning of the network data in view of one or more thresholds for various sensitivity levels of the destination endpoint.

6. The apparatus of claim 5, wherein to identify the subset of signatures specific to the confidentiality of the sensitive content data stored at the destination endpoint comprises the processing device to:
   identify individual signatures of the plurality of signatures in view of one or more policies, wherein the one or more policies define the individual signatures that correspond to the confidentiality of the sensitive content data stored at the destination endpoint in view of user input.

7. The apparatus of claim 5, wherein to identify the number of signatures that is proportional to the confidentiality of the sensitive content data stored at the destination endpoint the processing device is configured to:
   identify a greater number of signatures for data that corresponds to a high level of sensitivity than a number of signatures for data that corresponds to a low level of sensitivity.

8. The apparatus of claim 5, wherein the confidentiality of the sensitive content data stored at the destination endpoint is in view of at least one of user input or user activity data.

9. A non-transitory computer readable storage medium including instructions that, when executed by a processing device, cause the processing device to:
   determine a destination identifier from a network payload;
   perform a hash function on the destination identifier to compute a hash value, wherein a destination endpoint is determined by using the hash value as a key to query destination mapping data and wherein the hash function is defined in stored configuration data;
   determine a sensitivity level of the destination endpoint that was determined based on the hash value, of the destination endpoint in view of the destination identifier, wherein the sensitivity level is based at least in part on confidentiality of content of data stored at the destination endpoint;
   identify one or more rules that correspond to sensitive content data stored at the destination endpoint, wherein the one or more rules describe a number of signatures in a subset of the plurality of signatures and specify individual signatures from the plurality of signatures to be included in the subset of the plurality of signatures and a prioritization action;

wherein the subset of signatures specific to the sensitive content data stored at the destination endpoint comprises a number of signatures that is proportional to a sensitivity level of content data stored at the destination endpoint, and wherein first content of the specific subset of the plurality of signatures is distinct from second content of other subsets of the plurality of signatures that correspond to other sensitivity levels;

determine whether the network data comprises an intrusion in view of the subset of signatures, wherein to determine whether the network data comprises an intrusion comprises prioritizing scanning of the network data in view of one or more thresholds for various sensitivity levels of the destination endpoint.

10. The non-transitory computer readable storage medium of claim 9, wherein identifying the subset of signatures specific to the confidentiality of the sensitive content data stored at the destination endpoint, the processing device to:

identify individual signatures of the plurality of signatures in view of one or more policies, wherein the one or more policies define the individual signatures that correspond to the confidentiality of the sensitive content data stored at the destination endpoint in view of user input.

11. The non-transitory computer readable storage medium of claim 9, wherein the number of signatures that is proportional to the confidentiality of the sensitive content data stored at the destination endpoint comprises:

a number of signatures that corresponds to a high level of sensitivity that is greater than a number of signatures that corresponds to a low level of sensitivity.

12. The method of claim 1, wherein prioritizing scanning of the network data comprises accessing rules which associate sensitivity levels with priorities for evaluating data.

13. The method of claim 12, wherein said priorities for evaluating data include an indication that processing of data corresponding to a sensitivity level of highly-sensitive should be processed with a high priority; and an indication that processing of data corresponding to a sensitivity level of non-sensitive should be processed with a low priority.

14. The method of claim 12, wherein scheduling of processing of data which is to processed with a high priority is added to a top of a queue; and wherein scheduling of processing of data which is to processed with a low priority is added to a bottom of the queue.

15. The method of claim 1, wherein determining the sensitivity level of the destination endpoint comprises accessing endpoint classification data that associates destination endpoints with a sensitivity level; and wherein identifying the subset of a plurality of signatures comprises using the determined sensitivity level to access rules which associate sensitivity levels with signatures.

16. The method of claim 1, wherein the prioritization action comprises:

when the sensitivity level of the destination endpoint is a low level of sensitivity, evaluation of the network data is marked as low priority; and when the sensitivity level of the destination endpoint is a high level of sensitivity, the evaluation of the network data is marked as high priority.

17. The apparatus as recited in claim 5, wherein:

when the sensitivity level of the destination endpoint is a low level of sensitivity, evaluation of the network data is marked as low priority; and when the sensitivity level of the destination endpoint is a high level of sensitivity, the evaluation of the network data is marked as high priority.

* * * * *